United States Patent [19]
Montanvert et al.

[11] 3,772,523
[45] Nov. 13, 1973

[54] METHOD AND APPARATUS FOR OPTICAL DETECTION

[75] Inventors: Michel Montanvert, Grenoble; Jacques Jeymond, La Tronche, both of France

[73] Assignee: Cometa S.A., Montfleury, France

[22] Filed: Jan. 24, 1972

[21] Appl. No.: 220,007

[30] Foreign Application Priority Data
Jan. 1, 1971 France.........................7103056

[52] U.S. Cl.......... 250/217 SS, 307/311, 250/214 R
[51] Int. Cl............................ G02f 1/28, H01j 39/12
[58] Field of Search..................... 250/217 SS, 206, 250/214 R, 211 J; 307/311

[56] References Cited
UNITED STATES PATENTS
3,443,109  5/1969  Broom et al..................250/217 SS
3,449,619  6/1969  Stalp..............................250/206 X
3,551,682  12/1970 Kerhoas.....................250/217 X SS
3,546,467  12/1970 Benjamin, Jr. et al. ....250/217 X SS

*Primary Examiner*—Walter Stolwein
*Attorney*—Joseph F. Brisebois et al.

[57] ABSTRACT

Electro-optical methods and apparatus characterized by the use of an optical beam emitted by an electro-luminescent diode and reflected by a catadioptric member onto a photo-transistor.

The diode is supplied with pulses from a pulse generator while the current produced by the photo-transistor 12 is transmitted through a transformer to a comparator which compares the pulse received to a reference pulse.

6 Claims, 4 Drawing Figures

METHOD AND APPARATUS FOR OPTICAL DETECTION

SUMMARY OF THE INVENTION

This application relates to a method of optical detection in which a continuous train of optical pulses is projected by an electro-luminescent diode toward a catadioptric reflector which, in the absence of obstacles, reflects said optical pulses along the axis of projection, and in which said reflected pulses are received by a photo-electric component (a photo-transistor for example). In this arrangement, as in arrangements utilizing a more conventional emitting source than an electro-luminescent diode, such as a simple lamp for example, the interposition of an opaque object in the path of travel of the emitted beam eliminates the received beam and actuates control means, checking means, or counting means.

It has already been suggested that electro-luminescent diodes be used which consist of a semiconductor of the PN type made of gallium arsenide (AsGa) which, when forwardly biassed emits a light ray within a relatively narrow band the wavelength of which is about 9,300 Angstrom units, which radiation is invisible. It is also known that electro-luminescent diodes emitting in the visible portion of the spectrum may be used. The use of an electro-luminescent diode has a number of advantages:

1. The emission of strong pulses of very short duration which make it possible to decrease the consumption of electricity as compared with that of an incandescent lamp having the same optical performance;
2. A miniature emissive source which makes it possible to decrease the dimensions of the detector;
3. A cold emissive source which makes it possible to position in the immediate proximity thereof elements which are sensitive to heat, and to utilize boxes of plastic material, thus providing complete insulation;
4. Operation with invisible light, and hence discreetly;
5. High reliability and length of life;
6. Excellent resistance to shock and vibration;
7. Absolute insensitivity to ambient light regardless of its intensity (whether from the sun, a fluorescent tube, or the like) so that the emitted light may be frequency-modulated.

Such an electro-luminescent diode may be associated with a receiver for the reflected beam, which may be of the phototransistor type, and made of silicon, for example, the sensitivity of which photo-transistor is at its maximum in the range of 9,300 Angstroms.

However, difficulties are generally encountered because the electro-luminescent diode has the disadvantage of being relatively sensitive to electrical forces. Moroever, the means actually used are not appropriate to prevent with certainty, in actual practice, the reception of parasitic rays which may result from auxiliary natural light, such as the sun, or artificial light, such as fluorescent tubes.

It is an object of the invention to provide a process and apparatus for purposes of detection which consumes very little power, is of small dimensions, works with a cold diode, with invisible light, is reliable, is mechanically sturdy, and is completely insensitive to parasitic optical rays and avoids with certainty the application of excessive electrical forces to the electro-luminescent diode.

In the process according to the invention reference pulses are imposed on the electrical pulses supplied by the photo-transistor, which reference pulses are of the same frequency and in synchronism therewith, but of smaller magnitude than the pulses which may be reflected, and these actuate control or measuring means in dependence on whether the reference pulses are not only superposed on but enclosed within the received pulses of greater magnitude. By thus comparing an optical magnitude of exactly the same frequency as the electrical magnitude received and operating in a high enough range of frequencies, it is possible, by appropriate synchronization, to eliminate all parasitic pulses, even those of an adjacent frequency. In effect, in the process according to the invention, super-position of one pulse entirely within the other will occur only if the received pulse is actually derived, through the emitted and reflected beam, from the reference pulse. This prevents any parasitic received pulse from having, even during the period of a single pulse, characteristics (e.g., phase, duration, frequency) such that it might be accepted as a pulse resulting from the reflection of an emitted pulse. As a consequence of this method of operation, the apparatus is completely insensitive to all parasitic light pulses regardless of their lower level.

In an apparatus utilizing this process, it is advantageous to provide that the generating circuit for producing the electrical pulses supplying the electro-luminescent diode comprises means for delaying the supply of the amplifier situated upstream of said electro-luminescent diode. It has been found, in effect, that it is during the intial supply of current that strong electrical forces are produced. On the other hand, the pulse generator (usually a multi-vibrator) is not brought to a state of equilibrium and often produces pulses which are clearly longer than during its normal period of operation, which transmits to the diode an amount of energy which is clearly greater than that which it can receive without impairment.

This risk is avoided by the delay means which, acting on the last amplifying stage just before the diode, permits the electrical components to reach their normal operating point over a period of several microseconds, and only after this point has been reached and the power of the pulses limited to their normal level, permits the transmission of the pulses to the diode without damage thereto.

Other characteristics and advantages of the present invention will become apparent from a reading of the following description of a preferred embodiment of the invention, given purely by way of example, with reference to the accompanying drawings, in which.

Figure 4:
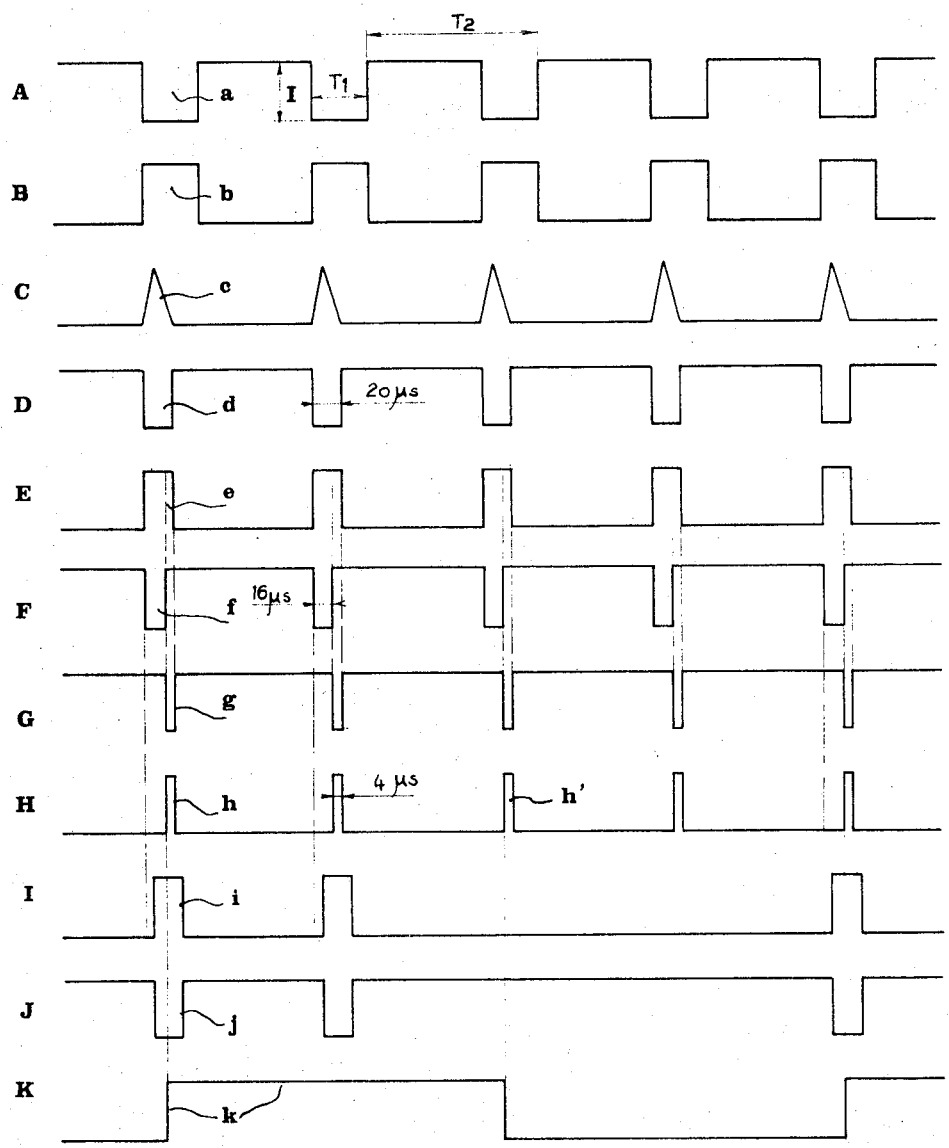
FIG. 4 is a succession of diagrams showing electrical pulses as a function of time.

Referring now to the attached drawings, an electro-luminescent diode 1 is supplied with electrical pulses by a pulse-generating circuit comprising in order: a multi-vibrator 2 supplying rectangular pulses a (diagram A, FIG. 4), having an amplitude I, a duration T1, and a period T2; a polarity inverter 3 which renders positive the pulses b (diagram B FIG. 4) derived directly from the pulses a; a circuit 4 transforming the rectangular pulses b into saw-tooth pulses c, the duration of which is 20 microseconds, for example (Diagram C, FIG. 4); a shaping circuit 5 which reconstitutes from the pulses c rectangular pulses d of negative polarity exactly calibrated with respect to time; a polarity inverting circuit 6 which transforms the negative pulses d into positive pulses e; and a power amplifier 7 controlled by an auxiliary delay device 8 which will be described in detail hereinafter and protects the electro-luminescent diode 1.

In operation, it will be seen that the electro-luminescent diode always receives a continuous chain of pulses such as e and that the characteristics thereof are, for example, the following: duration - 20 microseconds; period - 400 microseconds; amplitude - 0.5 amperes. The electro-luminescent diode this emits a train of light pulses of the same duration and the same frequency as the electrical pulses supplied. These light pulses are directed through a semi-transparent sheet 9 and a lens 10 towad a catadioptric reflector 11, the reflected beam being diverted by the semi-transparent sheet 9 toward a photo-transistor 12.

This photo-transistor 12 produces a current which is a function of the pulses received and is supplied to the primary of a pulse transformer 13, the characteristics of which are such that it transmits to its secondary only those variations in the current which are substantially at the frequency of the signals emitted by the electro-luminescent diode 1.

The pulsating current of the secondary 13 is applied to an amplifier 14 protected by a double-acting clipping circuit 15. The output signals of this amplifier 14 are supplied, on the one hand, to an integrator 16 associated with a measuring device 17 and, on the other hand, to an inverter 18.

A second path constituted by an inverter 19, a circuit 29 for converting to saw-tooth form, and a shaping circuit 21, forms the rectangular pulses f (diagram F of FIG. 4), which are synchronous with pulses e emitted toward the electro-luminescent diode 1, of the same phase, and slightly shorter in duration (for example 16 microseconds instead of 20 microseconds). A subtractor circuit 22 receives the two pulse trains e, f and delivers a train of pulses g which correspond in phase and frequency to a pulse having a duration such that, when added to the pulse f, the latter is extended in duration to the length of a pulse e. In other words the pulses g are short and so timed as to stop at the same time as a pulse e.

The pulses i and j at the output of the polarity inverter 18 and at the output of the amplifier 14 respectively, are applied at the same time as the reference pulses h (which correspond to the pulses g, the polarity of which has been inverted by the inverter 23) to a superposition comparator 24. The device 24 reacts in such a way as to provide a continuous current k (FIG. 4, diagram K) if the reference pulse h takes place within the duration of the emission of a pulse i or j and, on the contrary, to deliver no current if such reference pulses h are not bracketed within a pulse i or j, whether because the receiving circuit does not emit any pulse (due to cut-off of the beam emitted by the electro-luminescent diode 1 by an obstacle) or because the received pulses, if any, are not synchronized or are out of phase with the reference pulses h. This superposition of the reference pulses h and their bracketing within the pulses due to the electro-luminescent diode 1 is rendered very easy by a slight phase displacement between the received pulses i and j with respect to the pulses e and f generating the reference pulses h, due to the response time of the photo-transistor 12 and the phase displacement introduced by the transformer 13. This phase displacement is useful because it ensures that each reference pulse is bracketed within a received pulse i or j.

Advantageously, the superposition device 24 supplies a current k which corresponds to the logic 1 (lack of obstacle on the light beam) whereas an absence of current corresponds to logic 0. The output of the superposition device 24 is connected to an amplifier 25 which controls a reed switch 26 which is designed to ensure galvanic isolation between the receiving circuit described and a power amplifier 27 supplying a load 28 which may be a relay, a logic circuit, a lamp, a pulse counter, etcetera.

In operation, it has been seen that there must be superposition in time of a reference pulse h inside a received pulse i or j in order to produce a signal (current k) indicating the proper operation of the device and the absence of an obstacle to the emitted light beam.

When the beam is interrupted by an obstacle, the absence of pulses i and j from the first pulse h' (FIG. 4H) produces a zero current. In all cases, the parasitic currents are eliminated, those having a continuous component and a frequency very different from the pulse frequency by the transformer 13, those having a frequency adjacent the emitted pulses by the synchronous detection of the pulses incorrectly received (that is to say, those which do not result from the emission of pulses by the electro-luminescent diode 1).

Certain particular features will now be described in detail.

A delay circuit 8 makes it possible for the amplifier 7 to function and consequently supply the electro-luminescent diode only a certain time after the equipment has been energized. This device makes it possible to avoid with certainty the risk of overloading the electro-luminescent diode 1 due to transitory excess voltages and/or the initial emission of excessively long pulses by the multi-vibrator 2. This danger is avoided by the arrangement shown in FIG. 2 which shows the output conductor 30 of the inverter 6 and the electro-luminescent diode 1. This conductor 30 is connected to the base of a transistor 31, the emitter of which is in a potentiometric circuit comprising the resistance 32 between two transistors 33 and 34, one at the ground potential (zero), the other normally at the potential of the source E. The base of the transistor 33 is in a delay circuit comprising a resistance 35 and a condenser 36. Consequently, at the instant the equipment is energized (apparition of potential E) the transistor 33 is blocked by the effect of the time constant of the resistor 35 — condenser 36 circuit for a length of time sufficient for the normal operating conditions to be established in all the circuits. The transistors 33 and 34 unblock each other and, when the transistor 35 becomes conductive, it connects the emitter of the transistor 31 to ground and renders it conductive.

Figure 1:
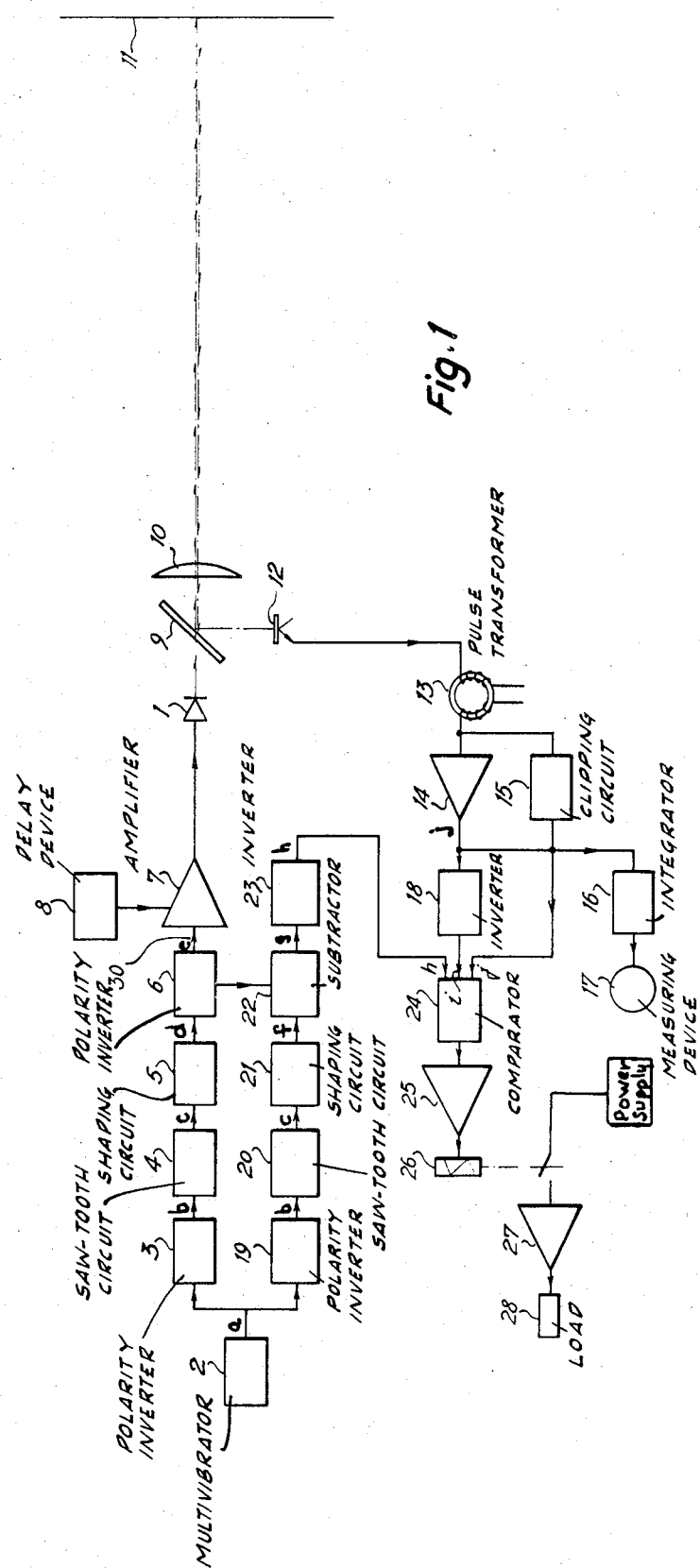
FIG. 1 is a schematic overall circuit diagram of the photo-electric detector.
Figure 2:
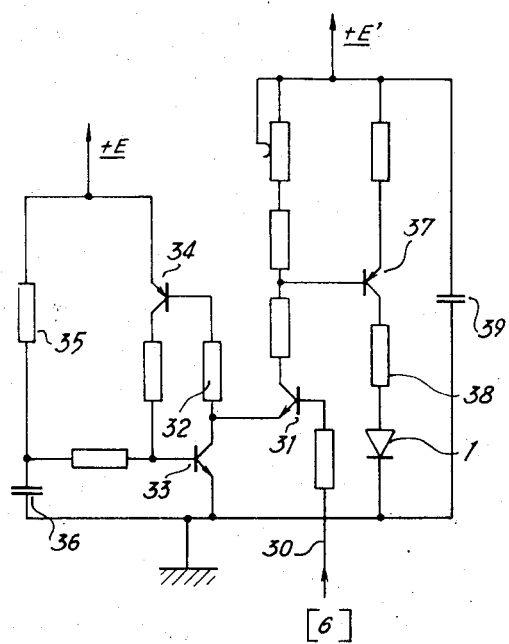
FIG. 2 is a partial circuit diagram showing in detail the device for protecting the electro-luminescent diode.

When transistor 31 becomes conductive it renders transistor 37 conductive, thus permitting the passage of pulses from the inverter 6 to the electro-luminescent diode 1. Another method of checking for good operation which is not shown in FIG. 2 is to compare the duration of a pulse which passes through the resistance 38 with the duration of a reference pulse and immediately interrupt the supply to the diode 1 if the pulse is too long.

Another feature of the device relates to the supply of power pulses to the diode 1. It has been seen that this supply is provided by rendering the transistor 37 conductive. The power necessary for this pulse comes from a condenser 39 connected to the terminals of a circuit comprising the diode 1, the resistance 38, and the transistor 37. In each period in which there is no pulse the condenser 39 recharges from the power source E'. Consequently, the important energy during the emission of each pulse is drawn off to the immediate vicinity of the buffer condenser 39. In the absence of this arrangement it is clear that the abrupt and substantial drawings off from the output E', would considerably disturb the different circuits being used.

Figure 3:
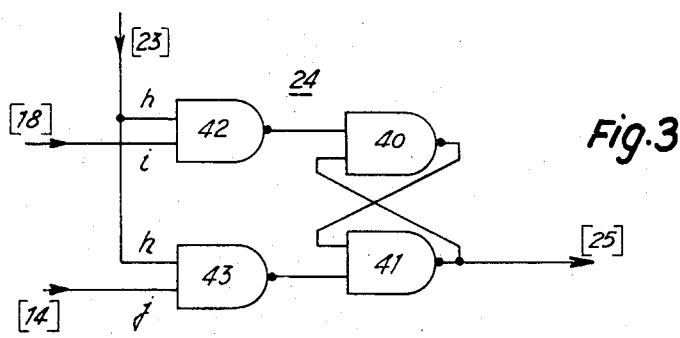
FIG. 3 is a circuit diagram showing in detail the device for comparing the signal received with a reference signal.

Another feature relates to the use of a superposition device the circuit diagram of which is given in FIG. 3. This bridge consists of NAND type memories 40 – 41 controlled by two circuits NAND control 42 – 43. This particular arrangement makes it possible to transform a pulse operation to a continuous operation with a very low time constant, and for this purpose, the signals $h$ and $i$, on the one hand, and $h$ and $j$, on the other hand, are applied to the NAND control 42 – 43, whereas the signal at the output of the NAND of memory 41 constitutes the switching signal. The following other advantages should be noted: the pulse transformer 13 has, in addition to its role as a pulse transformer, two other purposes, on the one hand the elimination of any continuous signal which could illuminate the photo-transistor 12 and thus render the reading head insensitive to any radiation other than that which is emitted by the electro-luminescent diode (e.g., from the sun, fluorescent tube, etc.), on the one hand, and, on the other hand, to prevent any accidental cutting off or short circuit on the photo-transistor. Pulses do not reach the amplifier 14 and everything happens as if the circuit was cut off.

The integrator circuit 16 makes it possible to use any commercial voltmeter despite the pulse range.

The reference pulse applied to the input of the memory 24 prevents any aleatory parasitic current which appears on the photo-transistor 12 from switching the comparator 24.

The flexible blade switch 26 makes it possible to isolate the circuits and thus prevent the passage of parasitic voltages between the control circuit and the load 28 and vice versa and, on the other hand, to control any type of logic circuit (for example the open contact may be replaced by a closed contact or an inverter), and also to control a logic circuit or, more generally, a load 28 the supply of which may be independent of the remainder of the circuitry.

The invention is applicable to all control arrangements, checking arrangements, and electrical or optical measuring arrangements, for example, a device operating in dependence on whether the light ray is interrupted, or a counting operation, or ordinary manufacturing processes which are optically controlled (for example packaging, or automated handling operations, etc.).

What is claimed is:

1. In a method of optical detection which comprises the steps of projecting a continuous series of optical pulses onto a catadioptric reflector which, in the absence of an obstacle within the path of travel of said pulses, reflects said optical pulses along the axis of their projection, and receiving the reflected optical pulses on a phototransistor, the improvement which comprises the step of superposing on the electrical pulses produced by said photo-transistor synchronized reference pulses of the same frequency, but shorter in duration, than the reflected pulses, and actuating indicating or control means in dependence on whether said reference pulses are completely embraced within the pulses from said phototransistor when so superimposed.

2. In an optical detector comprising an electroluminescent diode emitter and a photo-transistor positioned to receive emissions from said emitter via a catadioptric reflector, electrical pulse generating means for supplying electrical pulses to said emitter and for generating reference pulses of the same frequency but shorter in duration than those supplied tO said emitter, and means for deriving from the output of said phototransistor pulses of the frequency supplied to said emitter, the improvement which comprises a comparator circuit in which said reference pulses are superimposed on the pulses produced by said photo-transistor, and indicating or control means connected to be actuated in dependence on whether said reference pulses are completely embraced within the pulses from said photo-transistor when thus superimposed.

3. Optical detector as claimed in claim 5 which comprises a buffer condenser connected in parallel with said electro-luminescent diode between the supply for said diode and the output of said diode.

4. Optical detector as claimed in claim 5 comprising an integrator connected to the output of said amplifier.

5. Optical detector as claimed in claim 2 comprising an amplifier connected to amplify the pulses supplied by said pulse generator to said diode and means for delaying the supply of current to said amplifier.

6. Optical detector as claimed in claim 2 in which said comparator comprises means for converting a train of pulses resulting from a comparison therein into a continuous current, or into zero current, in dependence on whether a reference pulse is or is not superimposed on and embraced within a received pulse.

* * * * *

UNITED STATES PATENT OFFICE
CERTIFICATE OF CORRECTION

Patent No. 3,772,523　　　　　　　Dated November 13, 1973

Inventor(s) MICHEL MONTANVERT and JACQUES JEYMOND

It is certified that error appears in the above-identified patent and that said Letters Patent are hereby corrected as shown below:

[30]　　　　Foreign Application Priority Data

Jan. 29, 1971　　　　France.......71.03056

Signed and sealed this 16th day of April 1974.

(SEAL)
Attest:

EDWARD M.FLETCHER,JR.　　　　　　　C. MARSHALL DANN
Attesting Officer　　　　　　　　　　Commissioner of Patents